Oct. 16, 1923.
C. W. McKINLEY
1,470,996
TIRE OR WHEEL CARRIER
Filed Nov. 14, 1918
2 Sheets-Sheet 1
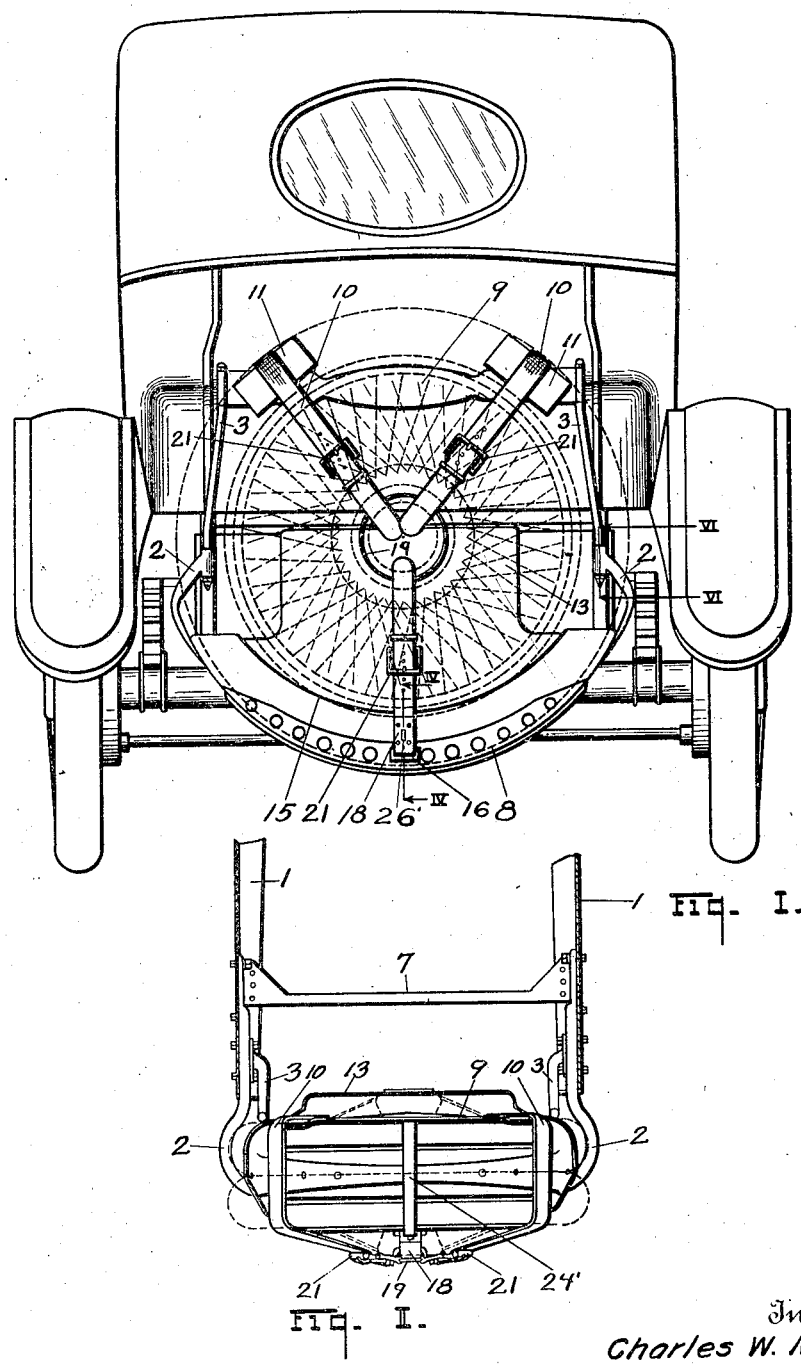
Inventor
Charles W. McKinley
By Chester H Broselton
Attorney

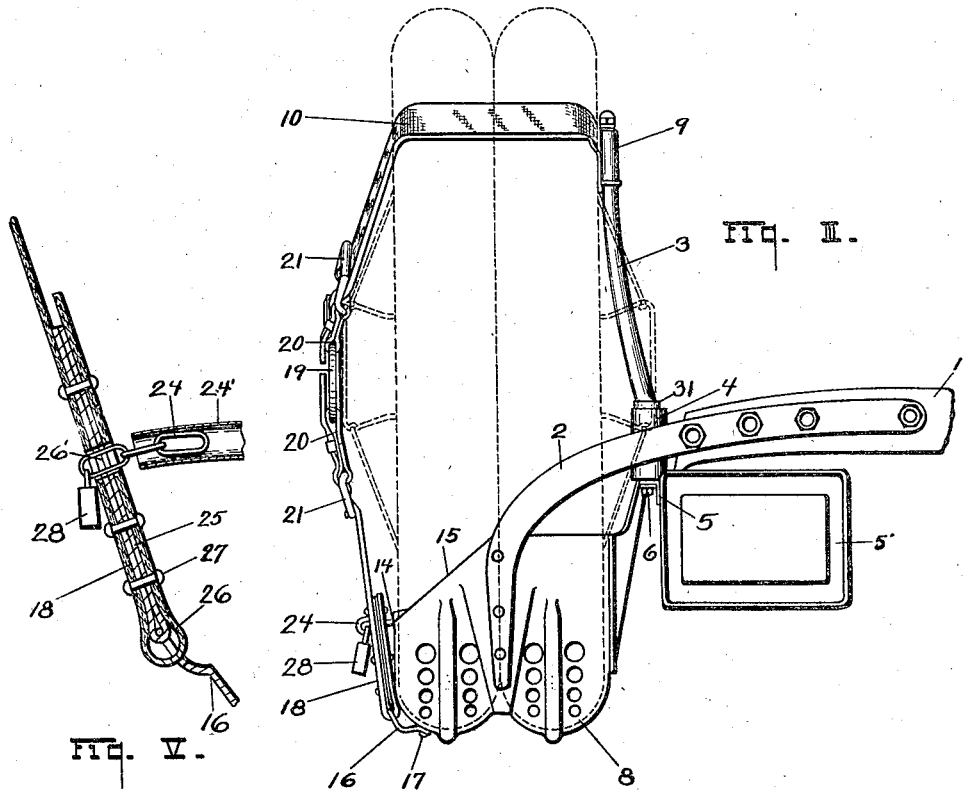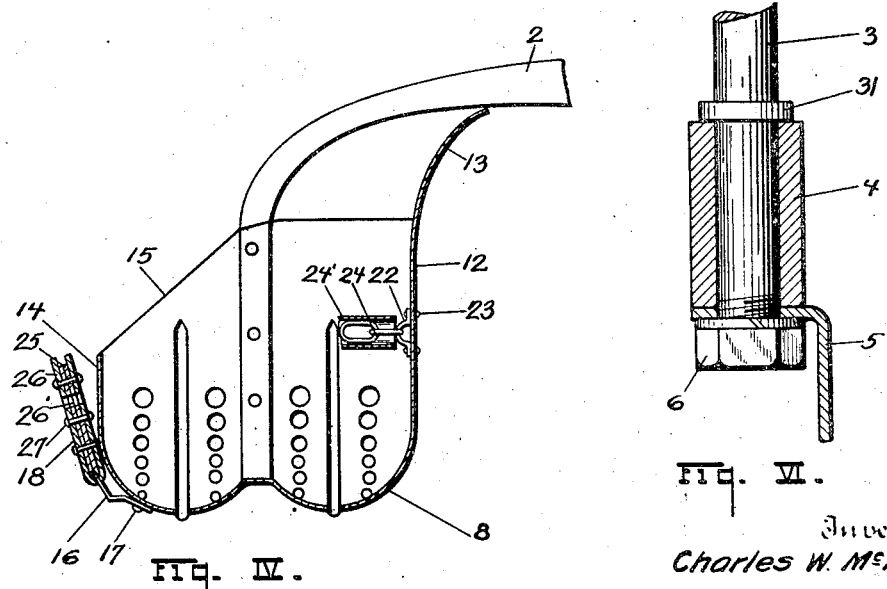

Patented Oct. 16, 1923.

1,470,996

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

TIRE OR WHEEL CARRIER.

Application filed November 14, 1918. Serial No. 262,509.

*To all whom it may concern:*

Be it known that I, CHARLES W. McKIN-LEY, residing at Toledo, Lucas County, and State of Ohio, have invented certain new and useful Improvements in Tire or Wheel Carriers, of which I declare the following to be a full, clear, and exact description.

This invention relates to improvements in tire or wheel carriers such as are attached to the frame of an automobile, for the purpose of carrying extra wheels or tires for use in the event of one of the tires of the automobile becoming punctured or one of the wheels broken while on the road.

The principal object of my invention is to provide an improved tire or wheel carrier in which the extra tires or wheels may be securely locked to prevent their removal by any unauthorized person, and yet so constructed as to enable them to be easily removed by the owner.

Another object of my invention is to provide an improved tire or wheel carrier so constructed as to be readily applied to the ordinary automobile frame, and in which the extra tires or wheels will be securely held and protected from injury.

Another object of my invention is to provide an improved tire or wheel carrier which is of simple construction, and efficient operation.

Further objects, and objects relating to economy of manufacture and details of construction and operation will definitely appear from the detailed description to follow.

I accomplish the object of my invention by the devices and means described in the following specification, and shown in the accompanying drawings. My invention is clearly defined and pointed out in the appended claims.

A structure constituting a preferred embodiment of my invention is illustrated in the accompanying drawing, forming a part of this specification, on which:

Fig. I is a rear elevation of an automobile with my improved carrier attached thereto.

Fig. II is a top plan view of my improved carrier attached to the frame of an automobile, the body of the automobile being removed.

Fig. III is a side view of my improved carrier showing the position of the parts when holding extra wheels therein.

Fig. IV is a fragmentary sectional view taken along the lines IV—IV Fig. I.

Fig. V is a longitudinal sectional view of the lower holding strap shown in Figs. I and III Fig. VI is a detail sectional view taken along line VI—VI of Fig. I, showing the connection between the rearwardly supporting arm and the upwardly extending bracing member.

In the drawings similar reference character refer to corresponding parts throughout the several views, and the sectional views are taken looking in the direction of the small arrows at the end of the section lines.

Referring to the numbered parts of the drawings, the numeral 1 designates the usual longitudinally extending frame members of the automobile which are connected by the transverse frame member 7 near their rear ends. The rearwardly extending supporting members 2 are connected to the longitudinally extending frame member of the automobile in any well known manner as being bolted or riveted thereto, and an upwardly extending bracing member 3 is connected to each of the rearwardly extending supporting members 2 at a point near the point of attachment of the rearwardly extending supporting member with the corresponding frame member of the automobile. The manner of connecting the upwardly extending bracing member and the rearwardly extending supporting member is shown in detail in Fig. VI.

The lower portion of each upwardly extending member is of reduced diameter and is inserted in a bearing 4 formed integral with the rearwardly extending supporting member 2 and through the bracket 5 attached to the fuel tank 5' and is held securely in position upon these members by means of the nut 6. Each bracing member 3 has a shoulder 31 formed thereon which rests upon the upper surface of the bearing 4.

Attached to the rearward ends of the rearwardly extending supporting members in any well known manner as by being bolted or riveted thereto is a basket 8 having two or more rounded grooves formed therein, which are designed to receive and support the extra tires or wheels.

The vertically extending bracing members 3 are connected near their upper ends by a plate 9, to which plate is attached by any suitable means one or more flexible strap members 10. These flexible strap members are each provided with a pad 11 attached thereto in any suitable manner, and designed to bear against the upper portion of the retained tires or wheels, for the purpose of retaining the tires in position and to prevent undue wear thereon.

The forward side of the basket 8 designated by the numeral 12 is extended upwardly and bent forwardly as at 13, to facilitate the ready insertion of the tires therein, and to assist in supporting the tires in upright position. The rearwardly extending portion of the basket 8 designated by numeral 14 is of less height than the side 12, being cut away along the sloping line 15. The rearward wall 14 of the basket 8 being thus cut away makes it possible to more readily insert the tires in the basket, and facilitates the locking of the tires therein in a manner which will be hereinafter described.

A metal plate 16 provided with a loop at one end thereof is attached to the rear portion of the basket 8 by rivet 17 or other suitable fastening means which metal plate carries a flexible strap member designated by the numeral 18. The particular construction of this flexible strap member will be set forth more in detail hereinafter. The flexible strap member 18 co-operates with the two flexible strap members 10 as will be seen particularly in Figs. I and III to hold the spare tires or wheels firmly in position in the basket. A ring 19 is provided, carrying a plurality of loops 20 thereon, the loops 20 being provided with buckles 21 adapted for connection to the flexible strap members 10 and 11 to firmly strap the spare tires or wheels in position and to hold them from unnecessary movement and consequent injury. To this end also the ring 19 is designed to fit against the hub of one of the spare wheels, when wheels are to be carried, and thus serve in a measure to protect the hub portion of the wheel from injury.

Attached to the inner front wall 12 of the basket 8 is a holding plate 22 which is securely held to the front wall 12 by rivets 23 or other suitable attaching means. The holding plate 22 carries a chain 24, which is preferably enclosed in a sheath formed of leather or other suitable material, to prevent the chain from wearing against the spare wheels and marring them. This chain 24 is of sufficient length to extend across the width of the basket 8, and the sheath 24' which encloses the chain extends across the basket, and terminates at such a point as to leave the last link of the chain exposed so that the last link may be inserted in the slot 26'; formed in the flexible strap member 18.

The flexible strap member 18, the section of which is shown in detail in Figure V of the drawing, comprises an exterior loop of leather or similar material designated by the numeral 26, and an interior loop of flexible metal designated by the numeral 25. These loops are securely attached together by means of rivets, or equivalent fastening means 27. It will be noted that the slot 26' formed in the strap 18 extends through the exterior loop of leather or other suitable material and through the inner loop formed of flexible metal such as spring steel.

It will be seen that by reason of this construction, when the chain 24 is extended across the basket 8 above the rim of the spare wheels, and the exterior link of the chain is passed through the slot in the strap 18 and held therein by the lock 28, the wheels are securely held against removal by an authorized person in that no part of the holding means can be severed without considerable difficulty.

I am aware that the particular embodiment of my invention which I have here shown and described, is susceptible of considerable variations, without departing from the spirit thereof, but I have found that this particular embodiment is desirable and therefore I desire to claim my invention both specifically and broadly, as indicated by the appended claims.

Having thus described my invention, what I claim as new, and desire to secure by Letters Patent, is:

1. In a device of the class described comprising in combination, a basket for supporting spare tires or wheels, means for holding spare tires or wheels in the basket, and preventing their removal by an unauthorized person, said means comprising a strap having a loop, a metal reinforcing member positioned within the loop formed in the strap and secured thereto, the loop and reinforcing member being provided with aligned slots, and a cable secured at one end to the basket the other end of the cable being adapted to be inserted through said slots.

2. In a device of the class described comprising in combination, a basket for supporting spare tires or wheels, a plurality of flexible members for holding the spare tires or wheels in the basket, one of said members being reinforced by a metal loop, a cable fastened at one end to the basket, the other end of the cable cooperating with the reinforced portion of this flexible member, and means for locking the cable on the reinforced member.

3. In a device of the class described comprising a basket for supporting spare tires or wheels; a plurality of flexible members for holding the spare tires or wheels in the basket; a common holding means for one end of each of the flexible members; said flexible members each being attached at one end to the said common holding means, and extending in a radial direction therefrom, a metal reinforce for one of the flexible members extending inwardly towards the common holding means from the point of attachment of the flexible member to the basket, and a flexible metal member secured at one end to the basket and at its opposite end to the metal reinforce.

4. In a device of the class described comprising an automobile frame, a basket for supporting spare tires or wheels, supporting members for supporting said basket from the said frame, bracing members attached to said supporting members, and flexible members attached to said bracing members, a flexible member secured at one end to the basket and having its oposite end connected to the ends of the first mentioned flexible members, the flexible member secured to the basket being provided with a metal reinforcing strip, and a metal cable having one end fixedly secured to the basket and its opposite end detachably secured to the reinforcing strip carried by the flexible member.

5. In a device of the class described comprising an automobile frame, a basket for supporting spare tires or wheels; supporting members for supporting said basket from the said frame, bracing members attached to said supporting members, and flexible members for holding said tires or wheels in a substantially upright position in said basket and in proximity to the said bracing members, one of said flexible members being provided with a flexible metal reinforce, a metal cable having one end secured to the basket, and means for detachably securing the opposite end of the metal cable to the metal reinforce.

6. In a device of the class described, a basket for supporting spare tires or wheels, a plurality of radially extending straps for securing the tires or wheels against removal, one of said straps being attached to the basket and provided with a flexible metal reinforcing member positioned within a loop formed in the end of the strap, a metal cable having one end fixedly secured to the basket, and means for detachably securing the opposite end of the cable to the metal reinforcing member.

In testimony whereof, I affix my signature.

CHARLES W. McKINLEY.